July 25, 1961 E. T. DOANE 2,993,418
PORTABLE TOOL FOR REFACING HOSE FITTINGS
Filed Dec. 30, 1957
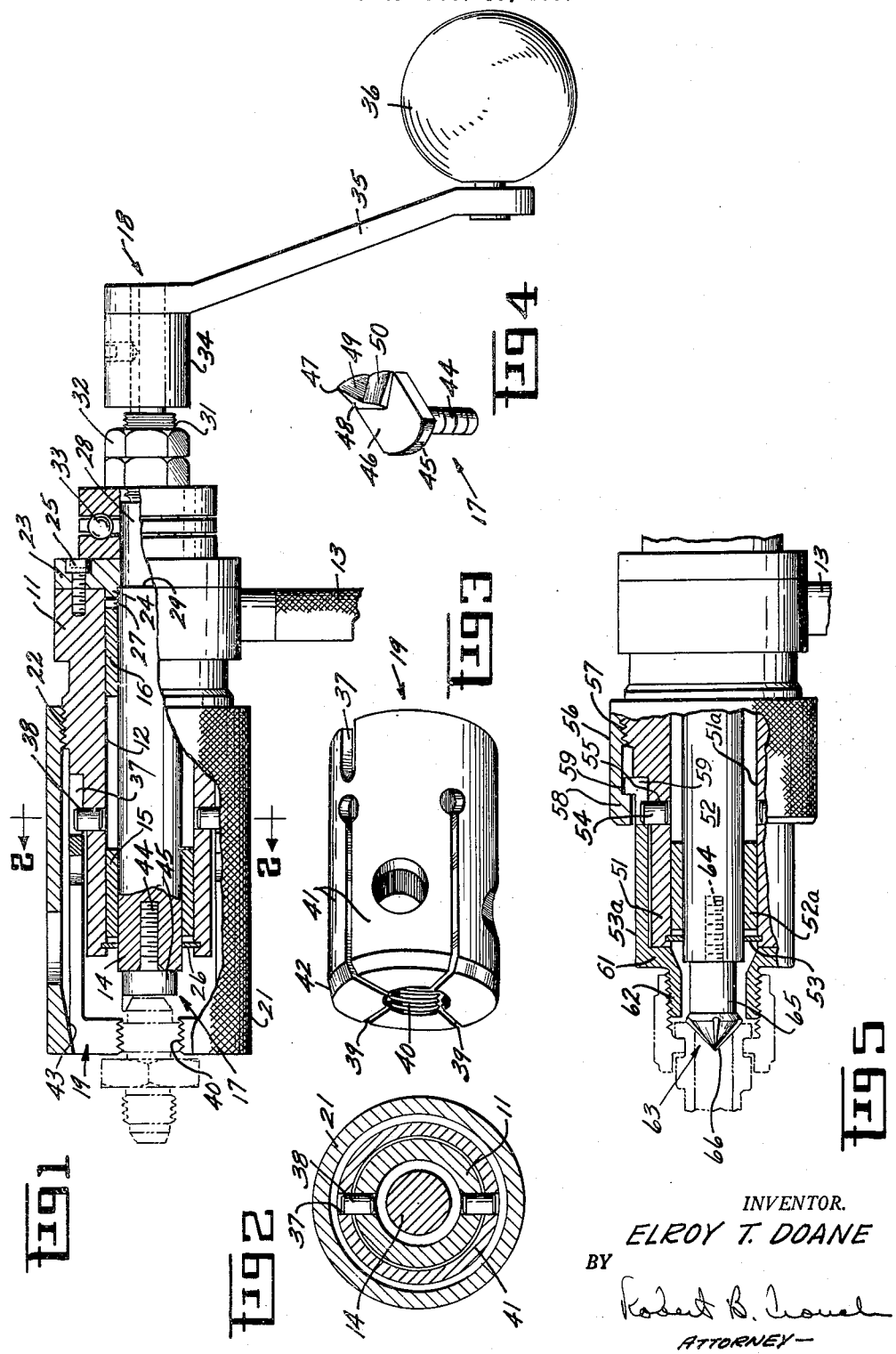
INVENTOR.
ELROY T. DOANE
BY
ATTORNEY United States Patent Office 2,993,418
Patented July 25, 1961

2,993,418
PORTABLE TOOL FOR REFACING HOSE FITTINGS
Elroy Tonnies Doane, Amelia, Ohio, assignor to General Electric Company, a corporation of New York
Filed Dec. 30, 1957, Ser. No. 706,000
1 Claim. (Cl. 90—12)

The present invention relates to a portable tool for refacing hose fittings and more particularly to a portable tool for refacing the machined surfaces of hose fittings without disconnecting the fittings from the hoses.

Fluid supply lines or hoses used with modern machines have to be accessible and capable of being disconnected for maintenance of the machine, and yet are required to be free from leaks. The fittings used for hose connections utilize a metal to metal contact between machined surfaces wherein a machined surface on one part is received within and seats tightly against another machined surface on a mating part. When these fittings are connected and disconnected, the machined surfaces are frequently scored or scratched by dirt or foreign matter or otherwise defaced, as by careless handling, to that leaks develop when the fitting is reassembled. To reduce the likelihood of leaks occurring which require frequent maintenance and repair, it has been the practice to discard defaced hose fittings and replace them with new fittings, or where rework of the fitting is feasible, to disconnect the fitting from the hose and reface the machined surface on a lathe. This practice has been expensive both in material and time and, in those instances where the fittings have been refaced, has necessitated that the machine be out of operation for relatively long periods of time.

An object of the present invention is to provide a portable tool for accurately refacing the machined surfaces of hose fittings.

A further object is to provide a portable tool for accurately refacing the machined surfaces of hose fittings without disconnecting the fittings from the hoses.

Another object is to provide a tool for refacing the machined surfaces of hose fittings which is simple to operate and which gives accurate results within close tolerances.

The present invention overcomes the disadvantages of the prior practices by provision of a portable tool for refacing the machined surfaces of hose fittings without disconnecting the fittings from the hose. The refacing tool of the present invention consists in essence of an elongated spindle mounted for rotation about its longitudinal axis within a hollow housing, a cutter on one end of the spindle, means for positioning a fitting adjacent the cutter and rigidly supporting it during the refacing operation, means for attaching a drive mechanism to the opposite end of the spindle to drive the spindle and rotate the cutter against the machined surface of the fitting, and means for regulating the depth of cut of the cutter to control the depth of material removed from the fitting.

Other objects and many of the attendant advantages of this invention will be readily appreciated as the same becomes better understood by reference to the following detailed description when considered in connection with the accompanying drawings wherein:

FIG. 1 is a plan view partly in section of a tool according to the present invention for resurfacing male fittings;

FIG. 2 is a sectional view taken along lines 2—2 of FIGURE 1;

FIG. 3 is a perspective view of a collet for use with the tool of FIGURE 1;

FIG. 4 is a perspective view of the cutter of FIGURE 1; and

FIG. 5 is a partial plan view partly in section of a modified form of the tool of FIGURE 1 for resurfacing female fittings.

Referring more particularly to FIGURE 1, the tool includes a cylindrical housing 11 having an internal bore 12 extending along its longitudinal axis and a handle 13 projecting laterally from one side thereof. An elongated cylindrical spindle 14 is positioned within the bore 12 and is supported for rotation in needle bearings 15 and 16. A cutter 17 is removably mounted in one end of the spindle and suitable driving mechanism, such as the crank 18, is adapted to be connected to the opposite end of the spindle. A generally cylindrical collet 19 is telescoped over one end of the housing in concentric relation with the cutter. A cylindrical chuck 21 surrounds the collet and threadedly engages the housing as at 22. A cap 23 closes off the end of the housing removed from the cutter and has an annular projection 24 which extends into the bore 12 in concentric relation with the spindle 14. The cap 23 is removably secured to the housing by any convenient means, such as the screws 25. The needle bearing 15 nearest the cutter is retained in position within the bore by means of a snap ring 26 and the needle bearing 16 is retained in position by an O-ring 27 wedged in place by the projection 24. The spindle is formed with a reduced section 28 which defines a shoulder 29 at its juncture with the remainder of the spindle and which extends through an opening in cap 23, the shoulder 29 bearing against the cap to retain the spindle in position within the bore. An externally threaded portion 31 is formed on the spindle adjacent the reduced section and the extremity of the spindle is machined or otherwise formed to receive the handle 18.

Referring to FIGURE 3 the collet 19 is a generally cylindrical tubular member having an open end and a partially closed end. The inner surface of the open end of the collet and the outer surface of the housing which it contacts when assembly thereon are both machined to close tolerances to ensure that no relative lateral motion occurs between the collet and the housing. The open end of the collet is provided with one or more slots 37 which receive pins 38 protruding from the housing to prevent rotation of the collet. The partially closed end of the collet is provided with a central opening 40 which is internally threaded to receive the externally threaded portion of a male fitting. The opening 40 is precision located to ensure that it is concentric with the cutter 17 so that a fitting received in the opening is centered with respect to the cutter and in the proper position to be refaced. The collet is further provided with a plurality of kerfs 39 extending inwardly from the partially closed end. The kerfs and the opening 40 divide the major portion of the collet into a plurality of sections or jaws 41. The jaws are spaced a small distance from the adjacent surface of the housing (FIG. 1) so that slight relative lateral movement is permitted between the jaws and the housing without displacing the open end of the collet. The circumferential edge of the partially closed end of the collet is chamfered as at 42.

Referring again to FIG. 1, when the tool is assembled the collet is positioned on the housing. The chuck 21 is then telescoped over the collet and threadedly engaged with the housing as at 22. As the chuck is rotated and tightened onto the housing, a beveled portion 43 on the inner surface of the chuck engages chamfer 42 on the collet. Further movement of the chuck then seats the collet firmly on the housing and causes jaws 41 to flex inwardly and grip the fitting. When the chuck is further tightened the jaws are clamped against the fitting to prevent its withdrawal and to support it rigidly in position to be refaced.

As shown in FIG. 4, the cutter 17 includes a threaded shank 44, an end piece or head 45 attached to an extremity of the shank, and a cutting tooth 46 formed on the head and offset from the center thereof. The cutting portion of the tooth 46 consists of edge 47 which is defined by three angularly related surfaces 48, 49 and 50. The edge 47 has two angularly related sections, one of which is adapted to bear against the end of the fitting and the other of which then contacts the beveled seating surface of the fitting. In assembled position the cutter is received in an internally threaded bore in the end of the spindle removed from the driving means. This bore is located on the center line of the spindle so that the cutter is concentric with the spindle and the opening 40.

The tool illustrated in FIG. 5 is adapted to resurface female fittings and includes a housing 51 having an internal bore 51a in which is rotatably mounted a spindle 52. One end of the spindle is supported by a bearing 52a which is held in place by snap ring 53. A collet 53a surrounds one end of the housing 51 and is prevented from rotating by means of the pins 54 mounted in the housing and received in slots 55 in the collet. The collet is retained in place on the housing by means of sleeve 56 which is threadedly engaged in the housings as at 57. The sleeve 56 is provided with an inturned lip 58 which bears against an out-turned lip 59 on the collet. The opposite end of the collet is provided with an inturned lip 61 and an externally threaded cylindrical projection 62 which engages the internally threaded coupling member of a female fitting. A cutter 63 is mounted on the free end of the spindle 52 and extends beyond the end of the projection 62. The cutter is provided with an externally threaded shank 64 adapted to be received within an internally threaded bore in the free end of the spindle, a spacing section 65 and a cutting head 66. The external surface of the cutting head is of conical configuration and provided with a number of sharp edged ribs which form the actual cutting surfaces. Similar to the tool of Fig. 1, the contacting surfaces of the collet 53a and housing 51 are machined to prevent relative lateral motion between the collet and housing, and cutter 63 is concentric with projection 62 so that the seating surface of a female fitting will be centered relative to the cutter when the coupling member of the fitting is engaged with the projection.

In the operation of the present tool, the proper sized collet and cutter are selected for the size fitting to be resurfaced. The cutter is mounted on the end of the spindle and the collet is placed over the end of the housing of the tool so that the pins 38, bottom in the ends of the slots 37. The fitting is then screwed into the opening 41 into contact with the cutter. The chuck is then positioned over the collet and screwed tightly onto the housing to clamp the fitting between the jaws of the collet. When the fitting is in proper position against the cutter, shoulder 29 on the spindle bears against the inside surface of the cap 23. Locknuts 32 are then adjusted to leave a desired spacing between themselves and the thrust bearing 33 (in the usual case this is 1/10,000 of an inch). Pressure is then applied to ball 36 and crank 35 is rotated causing the cutter to rotate against the seating surface of the fitting until locknuts 32 bear against the thrust bearing and the cutter rotates freely.

Similarly, to the tool of FIG. 1, in the operation of the tool of FIG. 5, the proper sized cutter and collet are selected to correspond with the size fitting to be resurfaced. The cutter is mounted in the free end of the spindle and the collet positioned on the end of the housing. Sleeve 56 is then screwed onto the housing and tightened to hold the collet in position so that pins 54 bottom in slots 55. The female fitting is then screwed onto projection 62 until the portion to be resurfaced contacts the cutter head forcing the spindle 52 to the right. The locknuts (not shown) are then adjusted to provide the proper spacing and pressure is applied on the spindle and the spindle rotated until the cutter runs free.

When the tool of the present invention is operated as a hand tool it is supported in one hand by the operator by handle 13 while crank 18 is rotated by the other hand. If a number of fittings require refacing at any one time, the crank can be removed and the tool mounted in a drill press. In such case the drill press chuck is attached to the spindle in place of the crank and the handle clamped to the head of the press to prevent the tool from rotating.

While particular embodiments of the invention have been illustrated and described, it will be obvious to those skilled in the art that various changes and modifications may be made without departing from the invention and it is intended to cover in the appended claim all such changes and modifications that come within the true spirit and scope of the invention.

What I claim as new and desire to secure by Letters Patent of the United States is:

A tool for resurfacing high-pressure hose fittings, comprising: a hollow cylindrical housing; an elongated spindle mounted within the housing for relative rotation thereto about its longitudinal axis; a cutter rigidly affixed to one end of the spindle and in concentric relation therewith; a collet slidably mounted on said housing in concentric relation to said spindle, said collet including a plurality of jaws for holding a fitting concentric to the spindle and rigidly in position adjacent to the cutter while it is being resurfaced; a chuck surrounding at least a portion of said collet for clamping the collet rigidly to the housing and to the fitting; an adjustable thrust bearing connected to the spindle for regulating the depth of cut of the cutter; means for locking said thrust bearing in the desired position; and means for driving the spindle to rotate the cutter against the fitting.

References Cited in the file of this patent

UNITED STATES PATENTS

| | | |
|---|---|---|
| 456,860 | Spencer | July 28, 1891 |
| 1,087,457 | O'Keefe | Feb. 17, 1914 |
| 1,927,463 | McIntosh | Sept. 19, 1933 |
| 2,071,138 | Nolan | Feb. 16, 1937 |
| 2,242,510 | Cogsdill | May 20, 1941 |
| 2,601,809 | Di Nardo | July 1, 1952 |
| 2,671,381 | Carlson | Mar. 9, 1954 |
| 2,811,903 | Harmes | Nov. 5, 1957 |

FOREIGN PATENTS

| | | |
|---|---|---|
| 1,144,120 | France | Apr. 23, 1957 |
| 724,788 | Germany | Sept. 5, 1942 |
| 770,207 | Great Britain | Mar. 20, 1957 |